Patented Mar. 18, 1952

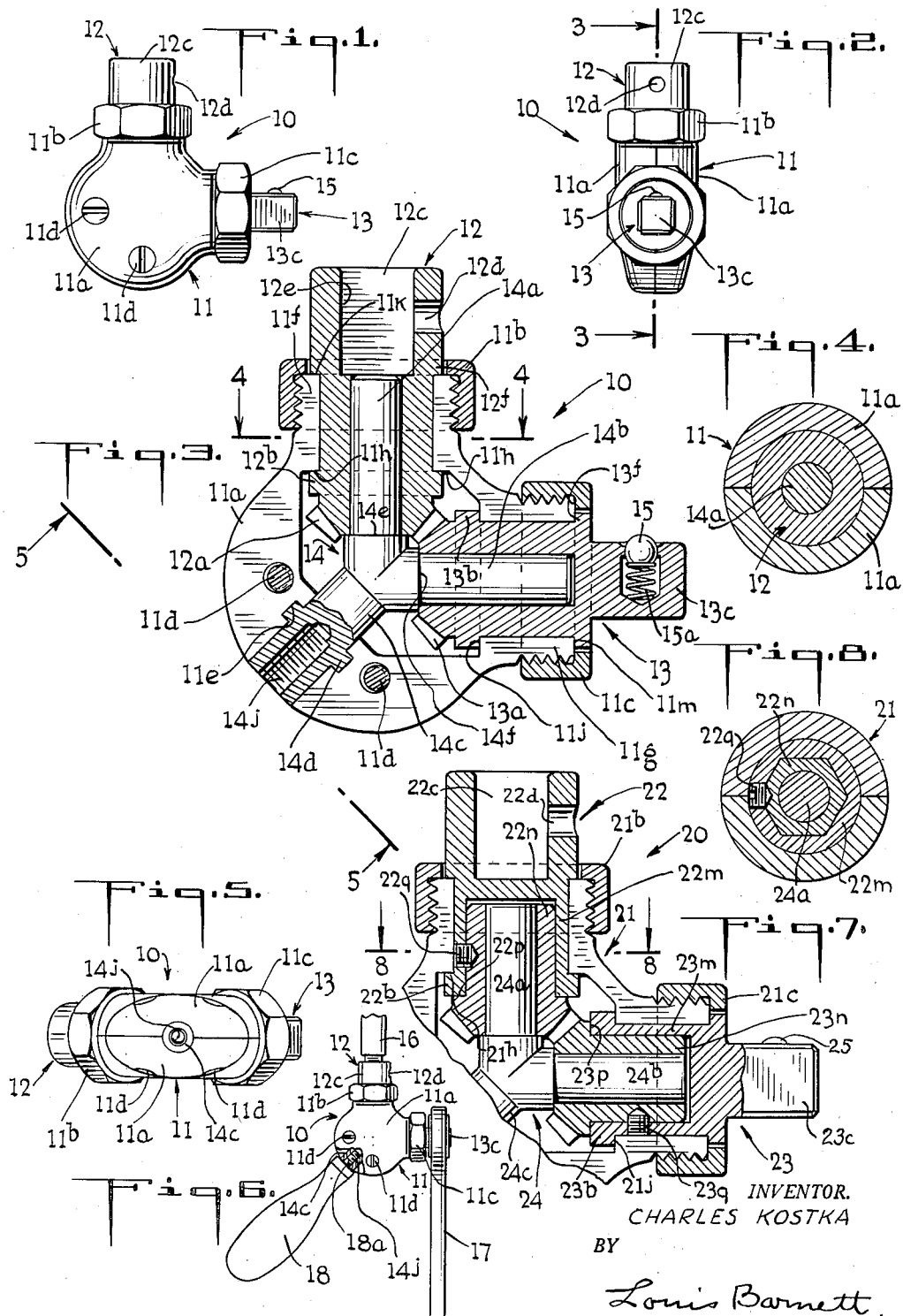

2,589,822

UNITED STATES PATENT OFFICE 2,589,822

ANGLE GEAR-TRANSMISSION COUPLING FOR ROTARY TOOLS

Charles Kostka, Bronx, N. Y.

Application May 8, 1950, Serial No. 160,799

11 Claims. (Cl. 74—423)

This invention relates to rotary tool devices and more particularly is directed to an improved angle gear transmission coupling for rotary tools or the like.

Among the objects of the invention is to generally improve devices of the character described which shall comprise few and simple parts forming rugged reliable angle gear transmission couplings for tools, such as for attachment of screw driver blades, wrenches, extension pieces, reamers, grinders, and the like, which shall be cheap to manufacture, which shall provide a novel gear assembly bearing, which shall form an improved tool accessory convenient to handle in close and remote quarters, and which shall be practical and efficient to a high degree in use.

Other objects of the invention will in part be obvious and in part hereinafter pointed out.

The invention accordingly consists of features of constructions, combination of elements and arrangements of parts which will be exemplified in the constructions hereinafter disclosed, the scope of the application of which will be indicated in the claims following.

In the accompanying drawing in which various embodiments of the invention is shown, Figs. 1 and 2 are front and side elevational views, respectively, of an angle gear transmission coupling for rotary hand tools constructed to embody the invention.

Fig. 3 is an enlarged cross-sectional view taken on line 3—3 in Fig. 2 showing the improved interior gear transmission drive assembly.

Fig. 4 is a cross-sectional view taken on line 4—4 in Fig. 3 showing a detailed bearing assembly.

Fig. 5 is a view of the improved coupling taken along line 5—5 in Fig. 3 showing the split casing assembly.

Fig. 6 is a side elevational view of the improved coupling like that shown in Figs. 1 and 2 provided with detachable hand grip means, fragmentary interconnecting extension end and fragmentary ratchet wrench.

Fig. 7 is an enlarged fragmentary cross-sectional view similar to Fig. 3 but showing a modified form of the invention, and Fig. 8 is a cross-sectional view taken on line 8—8. Fig. 7 showing a detail bearing assembly of the modified construction.

Referring in detail to the drawing, 10 denotes an angle gear transmission coupling device for rotary hand tools, such as, removably interchangeable attachment screw-drive blades, wrenches, extension pieces, reamers, grinders and the like, constructed to embody the invention. Said device 10 may comprise a split casing 11 here shown as formed of angular shaped mating halves 11a molded or forged to provide an L-shaped frame structure for totally enclosing a pair of gear members 12 and 13, said casing halves 11a being firmly retained together by suitable means, such as, opposite end cap screw fittings 11b and 11c and spaced intermediate clamping bolts 11d as is clearly shown in Figs. 1 to 6.

Gear members 12 and 13 as seen from Fig. 3, may be formed with teeth portions 12a and 13a, respectively, meshing in bevelled relation and retained in rotatable coaction by being supported on axle arms 14a and 14b, respectively, of Y-shaped branched shaft 14, a third arm 14c of said shaft 14 being neatly fitted in the assembly to firmly anchor said shaft 14 between said casing halves 11a secured by the cap fittings 11b, and 11c with said axle arms 14a and 14b in a central overhanging position within said casing 11 and with said third arm 14c positively retained against relative movement with respect to said casing 11 by the spaced clamping bolts 11d.

To secure shaft 14 in a desired fixed alignment third arm 14c may be integrally formed with a peripheral mid-flange 14d, said casing halves 11a being recessed or grooved at 11e to neatly receive said flange 14d as is clear from Fig. 3.

As seen from Figs. 1 to 4, casing ends 11f and 11g which terminate in cap screw fittings 11b and 11c, respectively, are of circular cross-section, with axle arms 14a and 14b rigidly retained to extend co-axially therethrough.

Meshing gear members 12 and 13 which are journaled on axle arms 14a and 14b, respectively, as shown in Fig. 3 may be integrally formed with thrust rings 12b and 13b, respectively, which bear against shouldered surfaces 11h and 11j, respectively, provided on the interior of casing 11. Said casing shouldered surfaces 11h and 11j and thrust bearing shoulders 14e and 14f provided on axle arms 14a and 14b, respectively, maintain said gear members 12 and 13 in proper meshing alignment.

Gear member 13 may terminate at end thereof opposite teeth portion 13a in an axially aligned male stub shaft 13c, which extends beyond end cap 11c, said stub shaft 13c being of conventional size and polygonal shape to demountably couple with a suitable ratchet wrench or crank handle 17 in the well understood manner and as shown in Fig. 6.

Suitable retaining means for said demountable coupling of wrench 17 on stub shaft 13c may be provided by a resiliently supported ball 15 which, as shown, is projected by compression spring 15a beyond the surface of said stub shaft 13c, said ball 15 being depressed against the action of spring 15a entering into engagement or disengagement with a suitable recess, such as, an end of a transversely extending opening 12d formed in female socket terminal 12c provided to terminate end of gear member 12 opposite teeth portion 12a in axial alignment therewith as is clear from Fig. 3.

Gear member 12 may be similar in construction to gear member 13 as described above with the exception as shown in the drawing that the male stub shaft 13c which extends beyond end cap fitting 11c is replaced by the female or socket terminal 12c, the latter having an axial passage 12e into which a length extension unit 16 may be selectively demountably fitted to turn therewith, said extension unit 16 being provided with a male stub shaft proportioned and sized like male stub shaft 13c as is clear from Figs. 3 and 6.

To make gear members 12 and 13 interchangeable in the assembly of coupling transmission device 10, said gear members 12 and 13 may be provided with integrally formed thrust rings 12f and 13f, respectively, which are similar to and spaced from thrust rings 12b and 13b, respectively, and located to respectively bear against end surfaces 11k and 11m of the ends of casing 11. The outer diameters of thrust rings 12f and 13f which pass freely through cap fittings 11b and 11c, respectively, and may be of a diameter to provide stock material of sufficient strength to form said female or socket terminal 12c as is clear from Fig. 3.

To facilitate handling device 10 in manipulating the rotary hand tools, manual gripping means for steadying the operation may be provided in the form of a handle 18 having a screw end 18a which is secured in threaded portion 14j of third arm 14c.

After constructing and assembling the various parts described above and shown in Figs. 1 to 6, the utility of angle gear coupling device 10 will be apparent.

When it is necessary or convenient to use a tool such as a screw driver, socket wrench, reamer, grinder or the like, in a confined space or remote distance, as for example, when repairing or in maintenance of motor vehicles, coupling device 10 will be found to be of great utility if not indispensable. As shown in Fig. 6, the handle 18 may be held in one hand to direct the rotary operation of female socket terminal 12c with or without a suitable interchangeable extension bar 16, while the other hand is free to manipulate a ratchet wrench or crank handle 17 demountably secured on male stub shaft 13c.

In Fig. 7 there is shown a modified angle gear coupling transmission device 20 constructed to embody the invention, and provided with split casing 21 and end cap screw fittings 21b and 21c and branched shaft 24 formed with shouldered axle arms 24a and 24b similar to device 10, but has gear members 22 and 23 journalled on axle arms 24a and 24b, respectively, each made as a two-piece structure to simplify the manufacture thereof.

Gear member 22 as seen from Figs. 7 and 8 has a telescoping or lap joint securing the two parts 22m and 22n thereof together, and gear member 23 has a telescoping or lap joint securing 23m and 23n together, bearing shoulders 22p and 23p. Suitable means such as set screws 22g and 23g may be provided to firmly retain said parts of gear members 22 and 23, respectively, together, said gear member parts 22m and 23m being provided with thrust rings 22b and 23b, respectively, cooperating with thrust bearing shoulders 21h and 21i, respectively, for retaining the gear members 22 and 23 in proper working alignment.

Gear member 22 like gear member 12 may terminate in a socket end 22c having opening 22b and gear member 23 in a stub shaft 23c provided with spring pressed ball 25. Said gear members 22 and 23, like gear members 12 and 13, respectively, of device 10 are interchangeable on axles 24a and 24b respectively.

Device 20 may be used in the same manner as described above for device 10.

It will thus be seen that there is provided angle gear transmission coupling devices whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An angle gear transmission coupling device for rotary tools comprising a split casing, a one-piece branched shaft having a pair of axles and an anchoring arm angularly disposed with respect to each other secured to the casing by said anchoring arm to extend therewithin, gear members having meshing teeth portions journalled on said pair of axle arms in bevel relation wholly with said casing, end portions carried by each gear member projecting beyond casing for detachably mounting manipulating attachments.

2. An angle gear transmission coupling device as defined in claim 1 in which said split casing is formed of mating halves, spaced apart means for securing said casing halves firmly together including end cap fittings wherethrough said gear members projecting end portions extending, and spaced apart fastening bolts extend adjacent said anchoring arm.

3. An angle gear transmission coupling device as defined in claim 1 in which is included a hand gripping means detachably mounted to said casing, said anchoring arm extending to the exterior of said casing formed with means for said detachable mounting of the hand gripping means.

4. An angle gear transmission coupling device as defined in claim 1, in which said anchoring arm includes an extending mid-flange, said casing being grooved on the interior thereof to neatly receive said flange for retaining alignment of said pair of axles with respect to said casing interior.

5. An angle gear transmission as defined in claim 1 in which said pair of axles are provided with thrust shoulders and said casing with gear members provide with thrust bearing surfaces for interchangeably retaining alignment of the gear members on their respective axles.

6. An angle gear transmission coupling device as defined in claim 1 in which said split casing is formed of mating halves, spaced apart means for securing said casing halves firmly together including end cap fittings wherethrough said gear members projecting end portions extending and spaced apart fastening bolts extend adjacent said anchoring arm, an extending mid-flange on said anchoring arm, said casing being grooved on the interior thereof to neatly receive said flange for retaining alignment of said pair of axles with respect to the casing interior.

7. In an angle gear transmission coupling device of the character described, a single piece Y-shaped branch shaft member constructed and arranged to be mounted within enclosing casing parts having a pair of axle arms for journalling thereon meshed bevelled gear members and an anchoring arm formed to be clamped by mating split casing parts of said device.

8. In an angle gear transmission coupling device of the character described, a Y-shaped branch shaft member as defined in claim 7 in which said axle arms have thrust shoulders for retaining said gear members in meshing alignment, and a mid-flange extending from said anchoring arm for aligning said shaft with respect to said casing parts.

9. In an angle gear transmission coupling device of the character described, a Y-shaped branch shaft member constructed and arranged to be mounted within an enclosing casing, said shaft member having a pair of axle arms for journalling thereon meshed bevelled gear members and an anchoring arm integrally formed with said axle arms for clamping by mating split casing parts of said device and handle attachment means carried by said anchoring arm.

10. An angle gear transmission coupling device as defined in claim 1 in which each of said gear members is of multi-piece construction for detachably interconnecting said teeth portion from the projecting end portion thereof.

11. An angle gear transmission coupling device as defined in claim 1 in which said split casing is formed of mating halves, spaced apart means for securing said casing halves firmly together including end cap fittings where-through said gear members projecting end portions extending, each of said gear members being of two-piece construction for detachably interconnecting said teeth portions from the projecting end portions thereof, and thrust surfaces on said casing for retaining the two-piece construction in effective aligning interconnection.

CHARLES KOSTKA.

REFERENCES CITED

The following references are of record in the file of this patent:

UNITED STATES PATENTS

| Number | Name | Date |
|---|---|---|
| 616,559 | Rasmussen | Dec. 27, 1898 |
| 2,284,871 | Huss | June 2, 1942 |
| 2,465,309 | Happe et al. | Mar. 22, 1949 |